Sept. 25, 1928.
B. R. BENJAMIN
1,685,267
TRACTOR PLOW
Filed Aug. 9, 1924 2 Sheets-Sheet 2
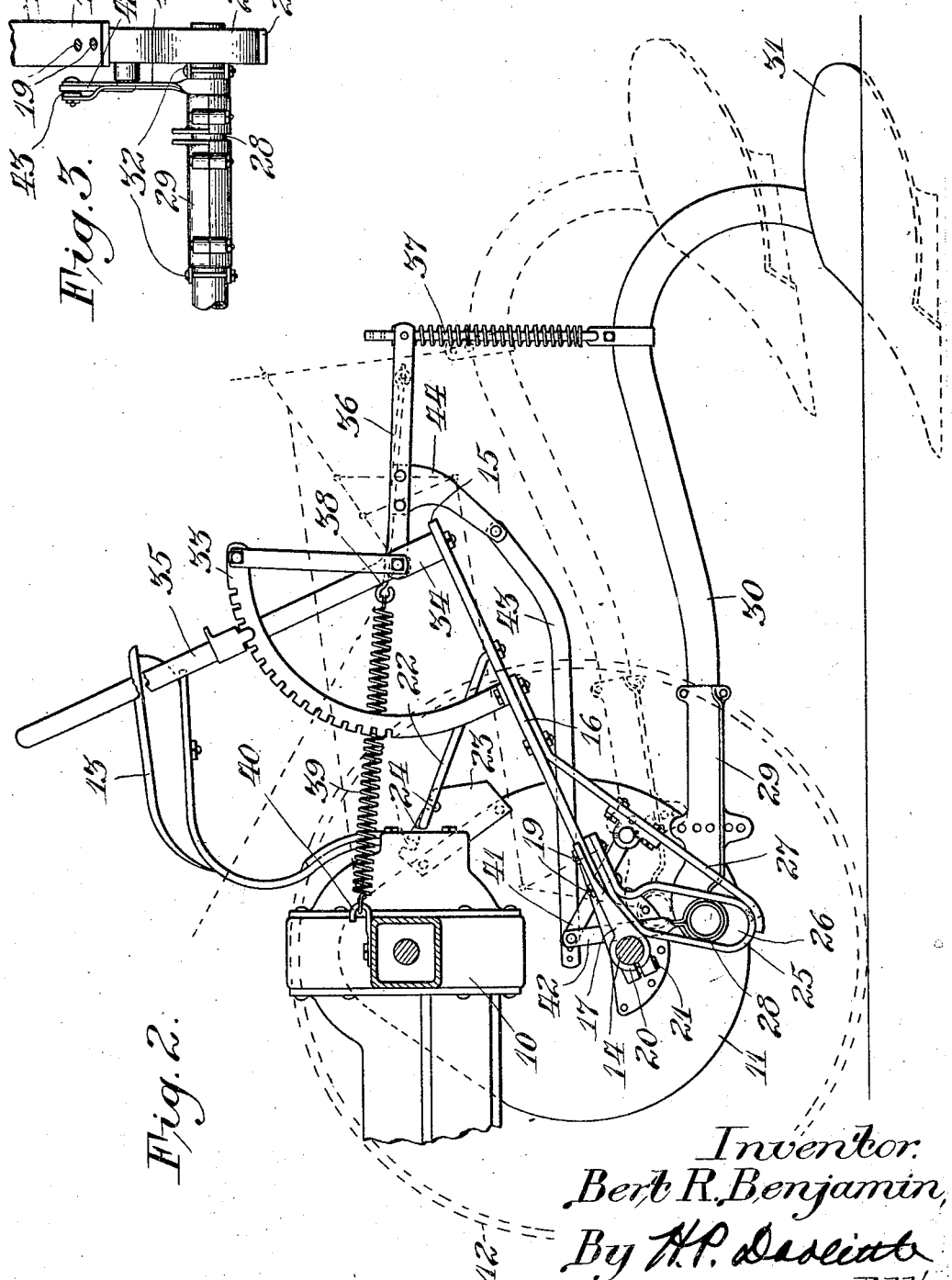
Inventor
Bert R. Benjamin,
By H. P. Daviette
Atty.

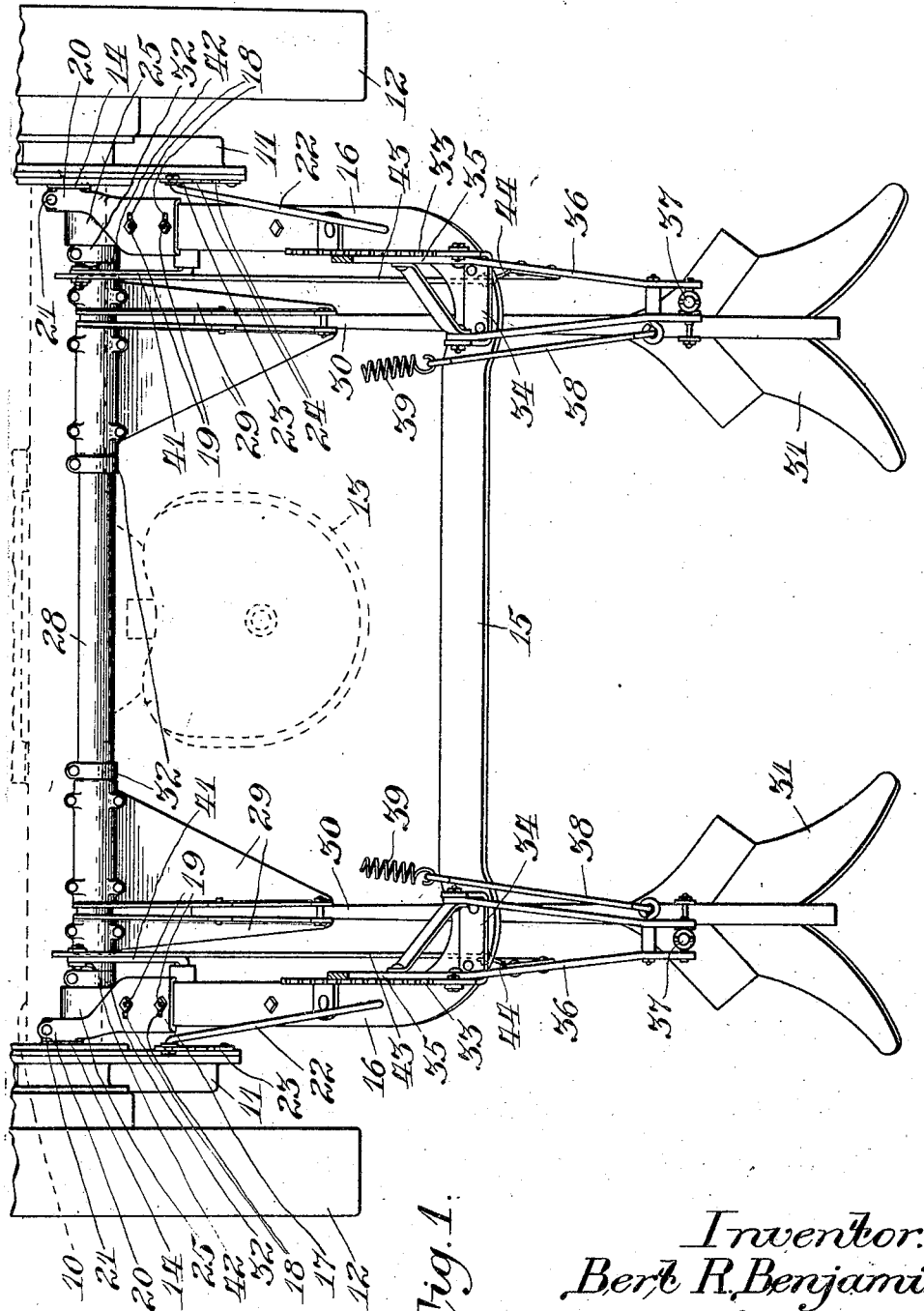

Patented Sept. 25, 1928.

1,685,267

UNITED STATES PATENT OFFICE.

BERT R. BENJAMIN, OF OAK PARK, ILLINOIS, ASSIGNOR TO INTERNATIONAL HARVESTER COMPANY, OF CHICAGO, ILLINOIS, A CORPORATION OF NEW JERSEY.

TRACTOR PLOW.

Application filed August 9, 1924. Serial No. 731,104.

This invention relates to tractor operated tillage implements and is more particularly directed to combination with a certain type of farm tractor of an implement carrying unit capable of being detached from the tractor when not wanted.

The main object of the invention is to provide an implement carrying attachment especially designed for use with tractors of the type having a wide arched or raised rear axle structure intended to straddle two plant rows. Further objects are to construct the attachment with a draft frame so designed that, when combined with the rear of the tractor, it will reinforce the axle structure to which it is attached and be capable of carrying two shovel plows of the middle breaker type at proper spacing; also, to provide lateral adjustment for such plow beams on the draft frame and to suspend the plow beams so that they can be lifted and lowered bodily with little effort and give ample clearance above the ground when raised.

The foregoing and other minor objects are accomplished by providing a unit adapted to be attached to a tractor axle, the unit comprising a novel construction of draft frame and implement attaching bar, the bar having implement beams, such as plow beams, secured thereto and the frame being provided with novel adjusting mechanism for lifting and lowering the attaching bar and implement beams, as hereinafter more specifically described and as defined in the claims.

Referring to the drawings,—

Fig. 1 is a plan view showing the rear portion of a tractor with the tillage unit combined therewith;

Fig. 2 is a side view of the structure in Fig. 1 with part of the axle structure of the tractor in section; and Fig. 3 is a detail view showing the relation of a draft bracket to the draft bar.

The invention is illustrated in combination with a tractor of the wide tread type comprising an upwardly arched rear axle structure forming the rear of the tractor frame and comprising a transverse housing 10 containing the differential with lateral shafts extending therefrom and depending housings 11 having upper portions fixed to the ends of the transverse housing and containing gearing driven by the lateral shafts for driving the spindles of the traction wheels 12. The central portion of the housing 10 containing the differential carries the driver's seat 13 as seen in Fig. 2.

On the lower inner portions of each of the housings 11 there are provided inwardly projecting cylindrical bosses 14 which serve as supporting elements for a transversely extending and rearwardly projecting U-shaped draw bar 15 forming the principal element of the draft frame. The bar 15 is preferably formed from a rigid flat metal bar with its arms 16 extending at right angles to its straight transverse bight portion. On each of the arms 16 there is mounted a coupling bracket 17 having a widened rear portion provided with a pair of parallel transverse slots 18 receiving fastening bolts 19 which pass through the forward ends of arms 16. At its forward end each bracket 17 is formed with a split pivot head 20 (Fig. 2) formed with a circular opening adapted to receive a boss 14. The parts of the split pivot head are connected by locking bolt 21. The purpose of the slots 19 in the pivot bracket is to permit a bracket to be shifted inwardly when bolts 19 are loosened, thereby releasing the bracket from the boss 14. A suspension link 22 at each side of the frame connects the rear portion of each arm 16 with a bracket 23 on casing 11 having a series of notches 24, into any of which the angularly bent end of link 22 is adapted to be secured, thus providing means for adjusting the bar 15 angularly.

Beneath the forward end of each arm 16 of the draft frame there is secured a depending draft bracket 25 preferably formed of a flat bar looped upon itself to provide a substantially vertical slot or guide way 26, and the ends of which are clamped together and to the arm 16 by means of the bolts 19 that retain the pivot bracket 17 in position. Each bracket 25 is braced on the arm 16 by a diagonal bar 27. A transverse draft bar 28, preferably cylindrical as shown, has its ends engaged in the guide-ways 26 of the brackets 25 and to this bar there are adjustably secured flanged coupling plates or brackets 29, between each pair of which there is fastened the forward end of an implement beam 30, which is illustrated in this instance as the beam of a middle breaker carrying the plow body 31. The coupling plates 29 are held in position by clamp collars 32, loosening of which permits the coupling plates and the beams they carry to be adjusted longitudinally of bar 28 to space the plows or other implements as desired.

On the rearward portion of each arm 16 and adjacent portion of the transverse part of frame 15 there is mounted an arcuate rack bar 33 fastened at one end to the arm 16 and at the other end to a bracket 34 secured to frame 15. The bracket 34 has pivoted on it a lever 35 which has the usual latch mechanism for cooperation with the rack bar 33. Lever 35 is of the bell crank type and has a rearwardly extending arm 36 connected by a spring pressure link 37 to the rear portion of plow beam 30. At a point near its outer end the arm 36 of each lever 35 is provided with an eye to which is coupled a rod 38 having its forward end connected to an extension spring 39 engaging with a hook 40 fixed on the axle casing. This spring connection with the tractor provides means for assisting the lift of the plow beam in the usual way.

In order to provide for parallel lift of both ends of the implement beam, each brace bar 27 has mounted on it about midway thereof (Fig. 2) a swinging arm or lever 41, the end of which is connected by a link 42 to one end of the draft bar 28. The end of each lever 41 is also connected by a link bar 43 with a pivot bracket 44 fixed to and extending downwardly from arm 36 of each lever 35. The arrangement is such that vertical movement of arm 36 will communicate similar movement through link 43 to lever 41 causing draft bar 28 and the forward ends of the beams 30 to be raised and lowered on the guide-ways 26 in unison with the rear of the beams, as indicated in broken lines on Fig. 2. The action of the lifting mechanism is to give an initial parallel lift to the beam until the top of the guide-way 26 is reached by bar 28, after which the rear of the beam may be given additional lift.

An important feature of the construction described is that the draft frame 15 extending across the arch of the axle structure and connected to its lower portions acts to reinforce or brace the axle and to assist it in withstanding the strains incident to the use of the implements carried by the draft frame. The adjustability of the draft frame by means of the suspension links 22 provides means for varying the depth to which the plows or implements may be lowered by the lifting and lowering mechanism, and provision of the parallel lift allows the transverse draft bar and implement beams to be raised a sufficient distance to clear obstructions during transport while retaining a low point of draft application to the plows during work. A further advantage of the structure is that the entire attachment or unit can be detached from the tractor by loosening bolts 19 of the pivot brackets 17 allowing the brackets to be slipped off of bosses 14 and the unit to be removed after unhooking springs 39. Optionally, the draft bracket 25 and braces 27 together with racks 33 and brackets 34 may be detached from the draft frame 15 leaving it in position on the tractor to serve as a draw bar for other implements.

While the construction described includes preferred details of construction, it will be evident to those skilled in the art that modifications thereof are possible without departure from the scope of the invention as defined in the following claims.

What is claimed is:

1. The combination with a tractor having an upwardly arched axle structure at the rear, of a rearwardly extending U-shaped frame extending across said arch and having its arms connected to the lower portions thereof, a draft bracket fixed on the under side of each of said arms and formed with a substantially vertical guide-way, a transverse draft bar with its ends mounted on said guide-ways, a rearwardly extending implement beam secured to said bar, a bell crank lifting lever mounted on the outer portion of the U-shaped frame with one arm connected to the rear of the implement beam, a secondary lever mounted on the forward portion of said frame and connected to the draft bar, and a link connecting the two levers for joint movement, whereby parallel movement is imparted to the ends of the implement beam.

2. The combination with a tractor having an upwardly arched axle structure at the rear, of a rearwardly extending U-shaped frame extending across said arch and having its arms connected to the lower portions thereof, a draft bracket fixed on the under side of each of said arms, an implement beam pivotally connected to the draft brackets, and means mounted on the U-shaped bar for lifting and lowering the implement beam.

3. The combination with a tractor having an upwardly arched axle structure at the rear, of a rearwardly extending U-shaped frame extending across said arch and having its arms connected to the lower portions thereof, a draft bracket fixed on the under side of each of said arms and formed with a substantially vertical guide-way, a transverse bar having its ends mounted on said guide-ways, a rearwardly extending implement beam secured to said bar, and means mounted on the U-shaped frame for lifting and lowering the beam including means for simultaneously lifting and lowering the bar on the guide-ways.

4. The combination with a tractor having an upwardly arched axle structure at the rear, of a rearwardly extending U-shaped frame extending across the arch and having its arms pivoted to the lower portions thereof, means for changing the angular adjustment of the U-shaped frame, an implement beam pivotally supported from the arms of said frame, and beam adjusting means mounted on the outer portion of said frame.

5. The combination with a tractor having an upwardly arched axle structure at the rear, of a rearwardly extending U-shaped frame extending across the arch and having its arms connected to the lower portions thereof, a plow beam supported beneath said U-shaped frame on vertically shiftable connections, and means on said frame for moving the beam bodily in a vertical plane.

6. The combination with a tractor having an upwardly arched axle structure at the rear, of a draft frame mounted on the depending portions of the arched axle including a transversely extending member mounted for movement towards and from the ground, an implement beam secured to said member, and means on the frame for lifting and lowering said member and beam.

7. The combination with a tractor having an upwardly arched axle structure at the rear, of a rearwardly extending U-shaped frame extending across the arched axle and secured to the lower portions thereof, a transverse draft bar extending between the arms of said frame and pivotally mounted thereon, implement beams mounted on said bar and adjustable longitudinally thereof, and beam lifting and lowering means mounted on the U-shaped frame and connected to the beams.

8. An attachment for tractors comprising a U-shaped draft frame the arms of which are provided with means for connection to the rear of a tractor with the frame projecting rearwardly therefrom, draft brackets formed with substantially vertical guide-ways depending from the forward portions of the arms of said draft frame, a draft bar extending across the arms and shiftably carried on said guide-ways, implement carrying beams connected to said bar and extending beyond the frame, and means on the draft frame for bodily shifting said bar and beams towards and from said frame.

9. An attachment for tractors comprising a draft frame provided with means for rigid connection to the rear of a tractor and adapted to project rearwardly therefrom, depending draft brackets fixed to the forward portion of the draft frame, a draft bar extending across the frame and having vertically shiftable connections with said brackets, implement carrying beams secured to said draft bar and extending rearwardly below the draft frame, and means on the draft frame for bodily shifting the draft bar and beams towards and from said frame.

10. An attachment for tractors comprising a draft frame provided with means for rigid connection to the rear of a tractor and adapted to project rearwardly therefrom, depending draft brackets fixed to the forward portion of the draft frame, implement carrying beams extending rearwardly below the draft frame and having vertically shiftable connections with said brackets, and means on the draft frame for bodily shifting each beam towards and from said frame.

11. The combination with a tractor, of an implement attachment therefor including a draft bar, means embodying vertical guides for supporting said bar on the tractor, implement carrying beams connected to the draft bar, adjusting means for each of the beams, and means for moving any one of said beams bodily and translationally a predetermined extent upon actuation of the respective beam adjusting means.

12. The combination with a tractor, of an implement attachment therefor including a transversely disposed draft bar, means embodying vertical guides for slidably mounting said bar on the tractor, implement carrying beams connected to the draft bar and being laterally adjustable thereon, an adjusting mechanism for each of said beams, and means connecting the draft bar and adjusting mechanisms for moving any one of said beams bodily and translationally upon actuation of the respective beam adjusting mechanism.

13. The combination with a tractor of a draft frame hingedly connected to the rear end of the tractor and projecting rearwardly therefrom, means for angularly adjusting said frame on the tractor in a vertical direction, a transverse draft bar mounted below the forward portion of said draft frame adjacent its connection to the tractor, implement beams connected to said bar by means permitting adjustment in the direction of its length, and means on the draft frame for lifting and lowering the beams.

In testimony whereof I affix my signature.

BERT R. BENJAMIN.